(12) United States Patent
Sridhar et al.

(10) Patent No.: US 9,426,642 B1
(45) Date of Patent: Aug. 23, 2016

(54) SYSTEMS AND METHODS FACILITATING COMMUNICATION WITH RESPECT TO A PLURALITY OF COMMUNICATION NETWORKS USING PULLBACK TECHNIQUES

(71) Applicant: TAQUA WBH, LLC, Richardson, TX (US)

(72) Inventors: Anuradha Sridhar, Plano, TX (US); Keith Mumford, Surrey (GB); Matthew Christopher Perry, Plano, TX (US); Satish Agrawal, San Jose, CA (US); Shan Jen Chiou, Plano, TX (US)

(73) Assignee: Taqua, LLC, Richardson, TX (US)

( * ) Notice: Subject to any disclaimer, the term of this patent is extended or adjusted under 35 U.S.C. 154(b) by 0 days.

(21) Appl. No.: 14/635,676

(22) Filed: Mar. 2, 2015

(51) Int. Cl.
*H04W 4/00* (2009.01)
*H04W 8/06* (2009.01)
*H04W 60/00* (2009.01)
*H04L 12/26* (2006.01)

(52) U.S. Cl.
CPC ............. *H04W 8/06* (2013.01); *H04W 60/005* (2013.01); *H04L 43/50* (2013.01)

(58) Field of Classification Search
CPC ... H04W 48/18; H04W 60/00; H04W 88/06; H04L 43/50
USPC ................... 455/534.2, 435.1, 552.1, 435.2; 370/242
See application file for complete search history.

(56) References Cited

U.S. PATENT DOCUMENTS

| | | | | |
|---|---|---|---|---|
| 8,191,078 B1* | 5/2012 | Cullen | ................ | G06F 11/1443 707/610 |
| 2007/0026866 A1* | 2/2007 | Krishnamurthi | ...... | H04W 36/14 455/440 |
| 2013/0152175 A1* | 6/2013 | Hromoko | .......... | H04W 36/0011 726/5 |
| 2014/0105028 A1* | 4/2014 | Bhaskaran | ............ | H04W 68/12 370/242 |
| 2015/0017976 A1* | 1/2015 | Liu | ................... | H04W 36/0033 455/423 |

* cited by examiner

*Primary Examiner* — Danh Le
(74) *Attorney, Agent, or Firm* — Norton Rose Fulbright US LLP

(57) ABSTRACT

A mobile device may establish and register a connection to a first network at a registration server, and may subsequently establish and register a connection to a second network at the registration server. Registration of the connection to the second network may designate the second network as a primary network for providing services to the mobile device. In response to the registration of the connection to the second network, the mobile device may receive a notification indicating the connection to the second network is designated as a primary connection for providing at least one service to the mobile device. In response to receiving the notification, the mobile device may transmit, to a network entity, a pullback message including a request to refresh the registration of the first network at the registration server, thereby designating the first network as the primary network for providing the services to the mobile device.

36 Claims, 5 Drawing Sheets

SYSTEMS AND METHODS FACILITATING COMMUNICATION WITH RESPECT TO A PLURALITY OF COMMUNICATION NETWORKS USING PULLBACK TECHNIQUES

TECHNICAL FIELD

The present disclosure is generally related to wireless communications. More particularly, the present disclosure is related to pullback techniques for routing communications to and from a mobile device coupled to a plurality of communication networks.

BACKGROUND OF THE INVENTION

Modern communication networks are designed to provide high speed voice and data communication services to mobile devices. Such voice and data communication services enable the mobile devices to originate communications (e.g., mobile originated (MO) communications) to remote devices, and/or receive communications (e.g., mobile terminated (MT) communications) from the remote devices, and may also provide multimedia services, such as video streaming services, video call services, music streaming, etc. to the mobile devices. To facilitate such services, some communication networks, such as a cellular network, include a home location register (HLR) that stores information associated with mobile devices operating within the cellular communication network. For example, the HLR may store identity information (e.g., an international mobile subscriber identity (IMSI) number) for each mobile device that is subscribed to the cellular network. The HLR may also store location information that identifies network entities (e.g., a visiting location register (VLR), a general packet radio service (GPRS) support node, a serving GPRS support node (SGSN), etc.) that support a portion of the cellular network where the mobile device is presently located. Such location information may be used to route communications and service data to the mobile devices as the mobile devices roam from one services area of the cellular network to another. For example, when a MT communication is initiated to a mobile device in the cellular communication network, a query is sent to the HLR to determine a present location of the mobile device, so that the MT communication may be routed appropriately.

Additionally, some modern communication networks may include an internet multimedia subsystem (IMS) that provides an architectural framework for providing multimedia and other services (e.g., Wi-Fi calls) to the mobile devices. IMS networks include a home subscriber server (HSS) that operates as an HLR for the IMS network. For example, the HSS may store identity information for each mobile device coupled to the IMS network, and may also store location information that identifies IMS network entities supporting a portion of the IMS network where the mobile device is presently located. From a service provider standpoint, it may be cheaper (e.g., less demand for resources on the cellular network, etc.) to route MT communications (e.g., MT communications received at the IMS network and/or the cellular network) to the mobile devices via the IMS network, rather than the cellular network, whenever the mobile device is connected to the IMS network. However, according to the network standards specifications (e.g., 3rd Generation Partnership Project (3GPP) and 3GPP2 specifications) for cellular and IMS networks, the HLR and the HSS are to operate in parallel (i.e., as autonomous entities). Due to this design requirement, the HLR may be unaware of the mobile devices that have dual registration with both the HLR (e.g., the cellular network) and the HSS (e.g., the IMS network). Therefore, all MT communications received via the cellular network may be routed to the mobile device via the cellular network, even when the mobile device is simultaneously connected to both the cellular network and the IMS network.

Additionally, some mobile devices are configured to send and receive data via connections to wireless fidelity (Wi-Fi) networks or Long Term Evolution (LTE) networks. Such connections may be registered with the HLR and/or the HSS and may be used to route MT communications received at the cellular network and/or the IMS network to the mobile device via the Wi-Fi network or LTE network. This may reduce a cost to operate the cellular network and the IMS network, and may also reduce demand for resources in the cellular and IMS networks. Additionally, routing the MT communications to the mobile device via the Wi-Fi network may reduce a cost to operate the mobile device. For example, communications initiated by or received at the mobile device via the Wi-Fi network may not consume minutes of a subscription that a user of the mobile device has with a service provider that operates the cellular network and/or the IMS network, and may not consume a portion of a data plan of the subscription.

When the mobile device is connected to multiple networks (e.g., the cellular network, the IMS network, and/or the Wi-Fi network), the HLR and HSS may designate a last connection registered as a primary connection for routing MT communications received via the cellular network and the IMS network, respectively, to the mobile device. For example, if the mobile device registers the connection to the Wi-Fi network with the HLR, and subsequently registers a connection to the cellular network with the HLR (e.g., through a periodic update of the connection to the cellular network, a handover procedure within the cellular network, a new connection to the cellular network, etc.), the HLR may designate the connection to the cellular network as the primary connection for routing the MT communications received via the cellular network to the mobile device even if the mobile device is still connected to the Wi-Fi network. Thus, the resources of the cellular network may be utilized to provide communications and services to the mobile device even though the mobile device is simultaneously connected to the Wi-Fi network. This increases the costs to operate the cellular network and increases demand for resources within the cellular network. Additionally, this increases the cost to operate the mobile device, since minutes or a portion of a data plan of the user's subscription with the service provider may be consumed.

As another example, because the HLR and HSS operate autonomously, the HLR may designate the connection to cellular network as the primary connection for routing MT communications to the mobile device even if the mobile device has registered a connection to the IMS network with the HSS. Thus, the resources of the cellular network may be utilized to provide communications and services to the mobile device even when the mobile device is simultaneously connected to the IMS network. This increases the costs to operate the cellular network and increases demand for resources within the cellular network.

As yet another example, if the mobile device registers the connection to the Wi-Fi network with the HSS, and then subsequently registers a connection to the cellular network (e.g., through a periodic update, a new connection, etc.) with the HLR, MT communications received at the cellular network may be routed to the mobile device via the IMS network even though the mobile device is simultaneously connected to the Wi-Fi and cellular networks. Thus, the resources of the IMS network may be utilized to provide communications and services to the mobile device even though the mobile device is simultaneously connected to the cellular network and the Wi-Fi network. This increases the costs to operate the IMS network and increases demand for resources within the IMS network. Additionally this increases the cost to operate the mobile device, since minutes or a portion of a data plan of the user's subscription with the service provider may be consumed.

BRIEF SUMMARY OF THE INVENTION

In the present disclosure, methods, systems, apparatus, and computer-readable storage media for initiating a pullback technique for designating a network of a plurality of networks to which a mobile device is connected as a primary network for providing at least one service to the mobile device are disclosed. The plurality of networks may include, for example, a first network (e.g., a wireless fidelity (Wi-Fi) network, a 4th Generation (4G)/Long Term Evolution (LTE) network, an IMS network, etc.) and a second network (e.g., a 2nd Generation (2G) cellular network, a 3rd Generation (3G) cellular network, an IMS network, etc.). The mobile device may be configured to send/receive voice calls (e.g., voice over internet protocol (VoIP) calls, voice over LTE (VoLTE) calls, video calls, etc.) and send/receive data via the first network, and may be configured to send/receive voice calls (e.g., traditional cellular calls) and send/receive data via the second network.

In operation according to embodiments, a multimedia communication server (MMCS) may be communicatively coupled to a registration server (e.g., a server or network entity that manages information stored at a home location register (HLR) of the cellular network or a home subscriber server of the IMS network or is an integrated HLR/HSS entity) of the second network. When the mobile device connects to the first network, the MMCS may register the connection between the mobile device and the first network at the registration server of the second network. Subsequently, the mobile device may establish a connection to the second network, and the connection between the mobile device and the second network may be registered at the registration server. As explained above, because the registration of the connection between the mobile device and the second network was a last in time registration, the registration server may designate the registration of the connection between the mobile device and the second network as a primary connection for providing at least one service (e.g., a voice call, a data transfer, etc.) to the mobile device. For example, when a mobile terminated (MT) communication is received at the second network, the MT communication may be routed to the mobile device via the second network even though the mobile device is simultaneously connected to the first network and is expecting the communications over the first network.

To overcome this drawback, the MMCS may provide information to the mobile device to indicate that the connection to the first network is no longer a primary connection for providing at least one service to the mobile device. For example, when the connection between the mobile device and the second network is registered at the registration server, the registration server may transmit a message to the MMCS to indicate that the registration of the connection between the mobile device and the first network has been canceled. Upon receiving the message from the registration server, the MMCS may transmit a message to the mobile device indicating the cancellation. The mobile device, in response to receiving the message from the MMCS, may determine whether to refresh the registration of the connection between the mobile device and the first network. For example, the mobile device may determine whether it is within a coverage area of the first network when the message is received from the MMCS. If the mobile device determines that it is within the coverage area of the first network and prefers receiving communication over the first network, the mobile device may determine that the registration of the connection between the mobile device and the first network should be refreshed. As an additional or alternative example, the mobile device may determine a characteristic (e.g., signal quality, available data rate or throughput, cost, etc.) of the connection between the mobile device and the first network. If the characteristic of the connection satisfies a criterion (e.g., a threshold signal quality, a threshold available data rate or throughput, a threshold cost, etc.), the mobile device may determine that the registration of the connection between the mobile device and the first network should be refreshed. Additional aspects and techniques for determining whether to refresh the registration of the connection between the mobile device and the first network are described in detail below.

When the mobile device determines that the registration of the connection between the mobile device and the first network is to be refreshed, the mobile device may transmit a registration request to the MMCS. The MMCS, in response to receiving the registration request, may refresh the registration of the connection between the mobile device and the first network at the registration server. The refreshing of the registration of the connection between the mobile device and the first network causes that connection to become the last in time registration at the registration server, which in turn causes the registration server to utilize the first network to provide at least one service to the mobile device. For example, after the registration of the connection between the mobile device and the first network is refreshed, MT communications received at the second network may be routed to the mobile device via the first network, thereby reducing the cost to operate the mobile device and the second network and reducing demand for resources on the second network. Thus, one or more embodiments of the present disclosure cause the connection between the mobile device and the first network to be designated, at the registration server, as a primary connection for providing at least one service to the mobile device when the mobile device is within the coverage area of the first network, which may reduce a cost to provide at least one service to the mobile device, reduce a load on the second network, and/or result in the at least one service being provided to the mobile device with an increased quality of service (e.g., the first network may provide for faster data rates, higher quality calls, etc.).

The foregoing has outlined rather broadly the features and technical advantages of the present disclosure in order that the detailed description that follows may be better understood. Additional features and advantages will be described hereinafter which form the subject of the claims. It should be appreciated by those skilled in the art that the conception and specific disclosed embodiment may be readily utilized as a basis for modifying or designing other structures for carrying out the same purposes of the disclosed embodiments. It should also be realized by those skilled in the art that such equivalent constructions do not depart from the scope of the present disclosure as set forth in the appended claims. The novel features which are believed to be characteristic of the present disclosure, both as to its organization and method of operation, together with further objects and advantages will be better understood from the following description when considered in connection with the accompanying figures. It is to be expressly understood, however, that each of the figures is provided for the purpose of illustration and description only, and are not intended as a definition of the limits of the present disclosure.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
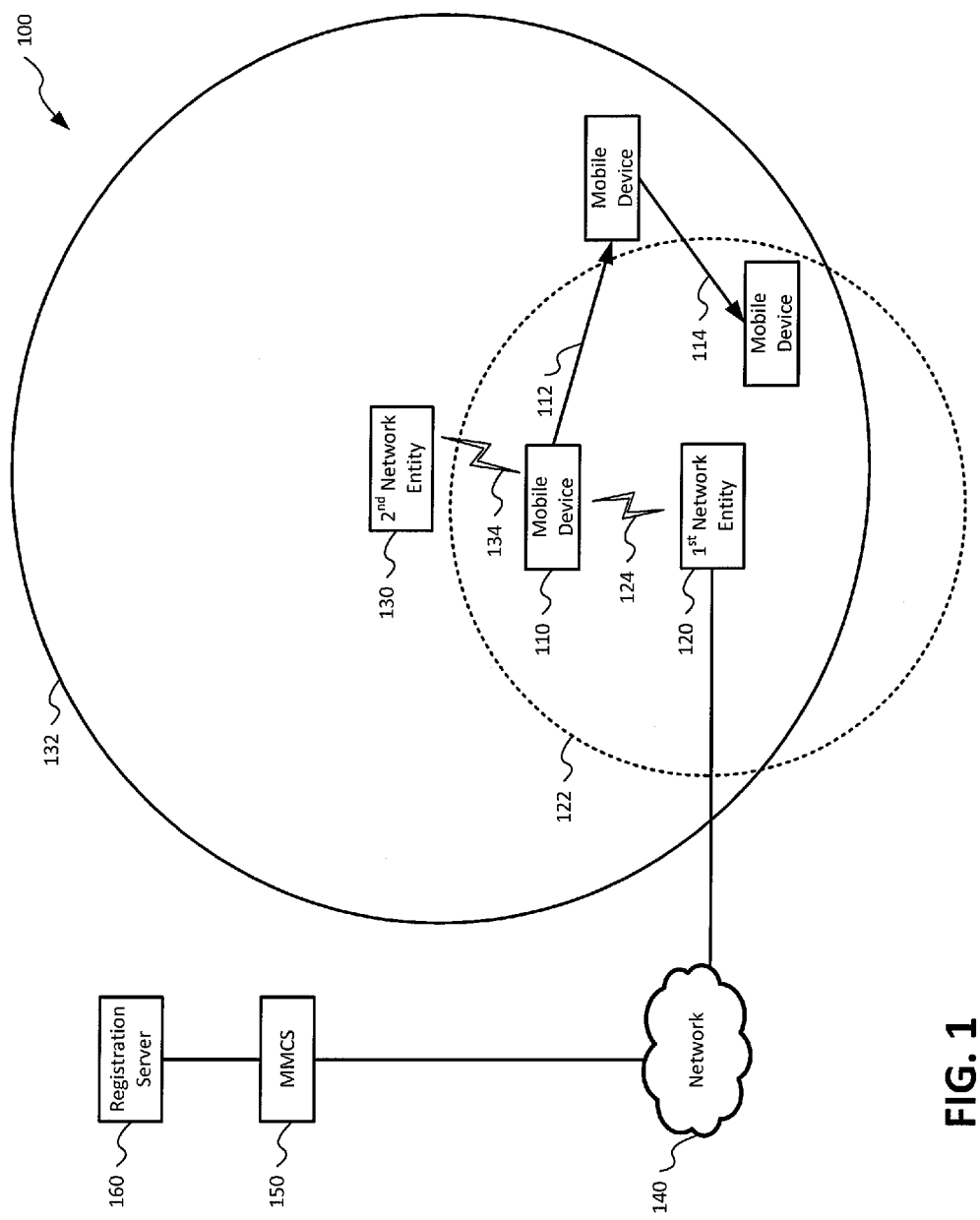
FIG. 1 is a block diagram of a system for providing services to a user equipment (UE) via two or more networks according to embodiments of the invention.

Referring to FIG. 1, a block diagram of a system for providing services to a mobile device via two or more networks is shown as a system 100. The system 100 is adapted to initiate a pullback technique to designate a network of the two or more networks as a primary network for providing the services to the mobile device in accordance with the concepts disclosed herein. As shown in FIG. 1, the system 100 includes a first network entity 120, a second network entity 130, a first network 140, a multimedia communication server (MMCS) 150, and a registration server 160. The registration server 160 may include a database storing information (e.g., subscription information, device identifiers, services accessible to the mobile devices associated with customers of the cellular communications provider, location information, etc.) associated with mobile devices of customers of a network service provider (e.g., both 3rd Generation Partnership Project (3GPP) and 3GPP2 Radio Access Technology).

The first network entity 120 may provide mobile devices, such as a mobile device 110, that are within a coverage area 122 of the first network entity 120 with access to the first network 140. In an aspect, the first network entity 120 may be an evolved Node B (e-Node B), a macro cell, a femtocell, a picocell, an access point, or any other device adapted to provide mobile devices within the coverage area 122 with access to the first network 140. In an aspect, the first network 140 may be an internet protocol (IP) network, such as a wireless fidelity (Wi-Fi) network. Additionally or alternatively, the first network 140 may be a communication network (e.g., a cellular communication network, a 4G/LTE communication network, an IMS network, etc.). The first network entity 120 may include a processor and a memory. The memory may store instructions that, when executed by the processor, cause the processor to perform the operations described in connection with the first network entity 120 with reference to FIGS. 1-5.

The second network entity 130 may provide mobile devices, such as the mobile device 110, within the coverage area 132 with access to a second network. In an aspect, the second network entity 130 may be an e-Node B, a macro cell, a femtocell, a picocell, an access point, or any other device adapted to provide mobile devices within the coverage area 122 with access to the second network. In an aspect, the second network may be a cellular network, such as a Code Division Multiple Access (CDMA) 2000, 1× (single-carrier) radio transmission technology (1×RTT), or Global System for Mobile (GSM) network.

The second network entity 130 may include a processor and a memory. The memory may store instructions that, when executed by the processor, cause the processor to perform the operations described in connection with the second network entity 130 with reference to FIGS. 1-5. A database (not shown in FIG. 1) may be accessible to the second network entity 130, and may store information associated with mobile devices that are associated with users having a subscription with the second network and/or an operator of the second network, as described in more detail below. In an aspect, the database may be stored at the memory of the second network entity 130. In an additional or alternative aspect, the database may be stored external to the second network entity 130 and may be accessed by the second network entity 130 via a wired or wireless communication link.

It is noted that the first network 140 and the second network may include additional components not shown in FIG. 1. For example, in an aspect, the first network 140 and/or the second network may include an authentication, authorization, and accounting (AAA) server, a session border controller (SBC), a media resource function server (MRF), a media gateway (MGW), a media gateway control function (MGCF), a signaling transfer point (STP), a short message service center (SMS-C), an intelligent network (IN), and a mobile switching center (G/S-MSC), and/or other components utilized to provide services in the first network 140 and the second network.

In an aspect, the first network entity 120 and the second network entity 130 may be provided by different service providers. For example, a first service provider (e.g., an internet service provider, etc.) may operate the first network entity 120 and maintain the first network 140, and a second service provider (e.g., a cellular communication service provider) may operate the second network entity 130 and maintain the second network. In an additional or alternative aspect, the first network entity 120 and the second network entity 130 may be provided by the same service provider. For example, the first service provider may provide cellular communication subscribers with access to the first network 140 via network entity 120 and provide the cellular communication subscribers with access to the second network via the second network entity 130.

In operation according to embodiments, the MMCS 150 may function as an internet multimedia subsystem (IMS) application server (AS) towards the first network entity 120, and may operate as a mobile switching center (MSC)/ visiting location register (VLR) towards the second network provided by the second network entity 130. For example, the MMCS 150 may operate as the IMS AS by providing services to the first network entity 120, such as notifying the registration server 160 when the mobile device 110 is attached to the first network 140, and providing interworking between the first network entity 120 and the second network entity 130. The MMCS 150 may operate as the VLR towards the second network by storing information (e.g., location information) associated with the mobile device 110 when the mobile, device 110 is attached to the first network 140, and notifying the registration server 160 when the mobile device 110 is attached to the first network. The MMCS 150 may operate as the MSC towards the second network by facilitating connection setup and signaling for MO communications from the mobile device and routing MT communications to the mobile device 110.

The MMCS 150 may include a processor and a memory. The memory may store instructions that, when executed by the processor, cause the processor to perform the operations described in connection with the MMCS 150 with reference to FIGS. 1-5. In an aspect, the MMCS 150 may provide transparent interworking between packet switched (PS) and circuit switched (CS) networks. For example, the MMCS 150 may utilize a signaling system 7 (SS7) interface and mobile application protocol (MAP), both GSM or American National Standards Institute (ANSI), signaling when communicating with core nodes of the second network, such as the registration server 160, the SMS-C, a voicemail server, etc. In an additional or alternative aspect, the MMCS 150 may communicate with the first network entity 120 and other nodes of the second network (e.g., the MGCF) using session initiation protocol (SIP) signaling, for example. A database (not shown in FIG. 1) may be accessible to the MMCS 150, and may store information associated with mobile devices that are served by the MMCS 150, as described in more detail below. In an aspect, the database may be stored at the memory of the MMCS 150. In an additional or alternative aspect, the database may be stored external to the MMCS 150 and may be accessed by the MMCS 150 via a wired or wireless communication link.

The mobile device 110 may be a wireless communication device, such as a smartphone, a cellular phone, a tablet computing device, a laptop computing device, a mobile communication device, a personal digital assistant (PDA), or another electronic device configured to communicate with a plurality of networks. In operation according to embodiments, the mobile device 110 may be configured to initiate a pullback technique for designating a network of the plurality of networks to which the mobile device 110 is connected as a primary network for providing at least one service to the mobile device 110, as described in more detail below. In an aspect, the mobile device 110 may be configured to send and receive wireless signals using a plurality of radio access technologies (RATs) and a plurality of communication protocols (e.g., a 2G cellular communications protocol, a 3G cellular communications protocol, a 4G/LTE communications protocol, an IP protocol, an 802.11 communications protocol, another wired or wireless communication protocol, or a combination thereof). The mobile device 110 may include a processor and a memory. The memory may store instructions that, when executed by the processor, cause the processor to perform the operations described in connection with the mobile device 110 with reference to FIGS. 1-5.

During operation according to embodiments, the mobile device 110 may establish a first connection 124 to the first network 140 (e.g., an IP network) using a first RAT, such as wireless fidelity (Wi-Fi) or LTE network. The first network entity 120 may register the connection between the mobile device 110 and the first network entity 120 at the MMCS 150, and the MMCS 150 may update an entry (e.g., an entry associated with the mobile device 110) in the database accessible to the MMCS 150 to indicate that the status of the mobile device 110 is attached (e.g., the mobile device 110 is connected to the first network 140). In an aspect, registration of the connection between the mobile device 110 and the first network entity 120 at the MMCS 150 may include transmission of one or more messages from the first network entity 120 to the MMCS 150. For example, in an embodiment, the first network entity 120 may transmit a SIP: register message to the MMCS 150. In an additional or alternative aspect, registration of the connection between the mobile device 110 and the first network entity 120 at the MMCS 150 may include an exchange of messages between the first network entity 120 to the MMCS 150. For example, in an embodiment, the first network entity 120 may transmit registration request (e.g., a SIP: REGISTER message) to the MMCS 150, and the MMCS 150 may transmit an registration request acknowledgement (e.g., a SIP: 200 OK message) to the first network entity 120 to indicate successful receipt of the registration request. It is noted that other signaling techniques may be used register the connection between the mobile device 110 and the first network entity 120 at the MMCS 150, and that the examples provided above are provided for purposes of illustration, rather than by way of limitation.

Subsequently, the MMCS 150 may register the first connection 124 between the mobile device 110 and the first network entity 120 at the registration server 160, which may indicate to the registration server 160 that the mobile device 110 is located within the coverage area 122 and that the mobile device 110 may receive mobile terminating (MT) communications via the first network 140 and the first network entity 120. In an aspect, during registration of the first connection 124 between the mobile device 110 and the first network entity 120 at the registration server 160, information associated with the mobile device 110 may be provided from the registration server 160 to the MMCS 150. The information associated with the mobile device 110 may include subscription information associated with a subscription of the mobile device 110 and other information associated with the mobile device 110. The subscription information may identify services accessible to or that may be provided to the mobile device 110 under the subscription. The MMCS 150 may update the entry associated with the mobile device 110 in the database accessible to the MMCS 150 using the information received from the registration server 160. In an aspect, registration of the first connection 124 at the registration server 160 may include transmission of one or more messages from the MMCS 150 to the registration server 160. For example, in an embodiment, the MMCS 150 may transmit a location update message (e.g., a MAP: update location request) to the registration server 160 to notify the registration server 160 of the first connection 124 between the mobile device 110 and the first network entity 120. In an aspect, registration of the first connection 124 at the registration server 160 may include an exchange of one or more messages between the MMCS 150 and the registration server 160. For example, in an embodiment, the MMCS 150 transmit the location update request to the registration server 160, and the registration server 160 may transmit an update location acknowledgement (e.g., a MAP: insert subscriber data request message) to the MMCS 150 to indicate successful receipt of the location update request. In an embodiment, the update location acknowledgement may include the subscription information associated with the mobile device 110. It is noted that other signaling techniques may be used register the connection between the mobile device 110 and the first network entity 120 at the registration server 160, and that the examples provided above are provided for purposes of illustration, rather than by way of limitation.

Additionally, during registration of the first connection 124 at the registration server 160, the registration server 160 may update an entry (e.g., an entry associated with the mobile device 110) in the database accessible to the registration server 160 based on the update location request received from the MMCS 150. In an aspect, updating the entry at the database may include updating the location of the mobile device 110 to indicate that the mobile device 110 is located at or attached to the first network 140, and that the mobile device 110 is accessible via the MMCS 150 and the first network entity 120.

After registering the first connection 124 at the registration server 160 (e.g., after the entry associated with the mobile device 110 at the database accessible to the registration server 160 has been updated to indicate the location of the mobile device 110 is the first network 140), the registration server 160 views the mobile device 110's location as being the first network 140 and the first network entity 120, and the registration server 160 may be adapted to facilitate providing of at least one service to the mobile device 110 via the first network 140. At least one service may include providing MT communications services (e.g., MT calls, MT short message service (SMS) messages, etc.) to the mobile device 110. For example, when an MT communication associated with the mobile device 110 is received at the second network, an entity of the second network, such as the second network entity 130, may query the registration server 160 for the current location of the mobile device 110. The registration server 160 may provide location information to the entity of the second network to enable the network entity to route the communication to the mobile device 110. For example, the registration server 160 may provide location information indicating that the mobile device 110 is currently located at the first network 140 and is accessible for receiving the MT communication via the first network entity 120. Thus, the network entity may route the MT communication to the mobile device 110 via the first network 140. In addition to receiving MT communications via the first network 140, the mobile device 110 may participate in MO communications via the first network. For example, in operation according to embodiments, the mobile device 110 may originate voice over Wi-Fi (VoWiFi) calls, voice over internet protocol (VoIP) calls, video calls, SMS messages, etc. using the first network 140.

Subsequent to registering the first connection 124 with the MMCS and the registration server 160, the mobile device 110 may establish a second connection 134 to the second network (e.g., the cellular communication network provided by the second network entity 130) using a second RAT (e.g., a 3G RAT) that is different from the first RAT. For example, a user of the mobile device 110 may be located within structure (e.g., a home or building) and the first network 140 may be a wireless network (e.g., a Wi-Fi network) provided by infrastructure (e.g., the first network entity 120) located within the structure. While the mobile device 110 is inside the structure, the mobile device 110 may receive good signal reception with respect to the first network 140, but the structure, or portions thereof, may interfere with reception of signals from the second network by the mobile device 110, thereby preventing or limiting the mobile device 110's ability to establish a connection to the second network.

Upon exiting the structure or moving the mobile device 110 to a location within the structure where the mobile device 110 is able to receive signals from the second network, the mobile device 110 may establish the second connection 134. For example, in response to a detecting signals from the second network from the second network entity 130, the mobile device 110 may transmit a registration request to the second network entity 130. Upon receiving the registration request, the second network entity 130 may establish the second connection 134 between the second network entity 130 and the mobile device 110. During establishment of the second connection 134, the second network entity 130 may transmit a registration request to location management entity of the second network that supports the second network entity 130. The location management entity may maintain a database (e.g., a visiting location register (VLR) (not shown in FIG. 1)) associated with mobile devices that are connected to the second network via the second network entity 130 and/or mobile devices that are connected to the second network via another network entity of the second network. The location management entity may update information within the database in response to the registration request received from the second network entity.

Additionally, the location management entity may register the second connection 134 between the mobile device 110 and the second network entity 130 at the registration server 160, which may indicate to the registration server 160 that the mobile device 110 is located within the coverage area 132 and that the mobile device 110 may receive MT communications via the second network and the second network entity 130. In an aspect, during registration of the second connection 134 between the mobile device 110 and the second network entity 130 at the registration server 160, information associated with the mobile device 110 may be provided from the registration server 160 to the location management entity. The information associated with the mobile device 110 may include subscription information associated with a subscription of the mobile device 110 and other information associated with the mobile device 110. The subscription information may identify services accessible to or that may be provided to the mobile device 110 under the subscription. The location management entity may update the entry associated with the mobile device 110 in the database accessible based on the information received from the registration server 160.

In an aspect, registration of the second connection 134 at the registration server 160 may include transmission of one or more messages from the location management entity to the registration server 160. For example, in an embodiment, the location management entity may transmit a location update message (e.g., a MAP: update location request) to the registration server 160 to notify the registration server 160 of the second connection 134 between the mobile device 110 and the second network entity 130. In an aspect, registration of the second connection 134 at the registration server 160 may include an exchange of one or more messages between the location management entity and the registration server 160. For example, in an embodiment, the location management entity may transmit the location update request to the registration server 160, and the registration server 160 may transmit an update location acknowledgement (e.g., a MAP: insert subscriber data request message) to the location management entity to indicate successful receipt of the location update request. In an embodiment, the update location acknowledgement may include the subscription information associated with the mobile device 110. It is noted that other signaling techniques may be used register the connection between the mobile device 110 and the second network entity 130 at the registration server 160, and that the examples provided above are provided for purposes of illustration, rather than by way of limitation.

Additionally, during registration of the second connection 134 at the registration server 160, the registration server 160 may update the entry (e.g., the entry associated with the mobile device 110) in the database accessible to the registration server 160 based on the update location request received from the location management entity. In an aspect, updating the entry at the database may include updating the location of the mobile device 110 to indicate that the mobile device 110 is located at or attached to the second network, and that the mobile device 110 is accessible via the second network and the second network entity 130. Thus, after registering the second connection 134 at the registration server 160 (e.g., after the entry associated with the mobile device 110 at the database accessible to the registration server 160 has been updated to indicate the location of the mobile device 110 is the second network), the registration server 160 views the mobile device 110's current location as being the second network 140 and the second network entity 130. Thus, the registration server 160 may facilitate providing of the at least one service to the mobile device 110 via the second network.

At the time the registration of the second connection 134 at the registration server 160, the mobile device 110 may still be within the coverage area 122 of the first network entity 120 and may still be connected to the first network 140. However, because the current location of the mobile device 110, as designated at the registration server 160, is the second network, MT communications received at the second network may be routed to the mobile device 110 via the second network, despite the mobile device 110 also being accessible for receiving the MT communications via the first connection 124 to the first network 140 and preferring the first network to receive MT communications. For example, after the current location of the mobile device 110 has been updated to indicate the second network, when an MT communication associated with the mobile device 110 is received at the second network, an entity of the second network, such as the second network entity 130, may access or query the registration server 160 for the current location of the mobile device 110. The registration server 160 may provide information indicating the current location of the mobile device 110 to the entity of the second network to enable the network entity to route the communication to the mobile device 110. For example, the registration server 160 may provide location information indicating that the mobile device 110 is currently located at the second network and is accessible for receiving the MT communication via the second network entity 130. Thus, the network entity may route the MT communication to the mobile device 110 via the second network, even though the mobile device 110 is still accessible for receiving the MT communication via the first network 140.

Additionally, the registration server 160 may notify the MMCS 150 that the current location of the mobile device 110 has changed in response to receiving the registration request from the location management entity. The notification may indicate to the MMCS 150 that the mobile device 110's current location, as viewed by the registration server 160, is no longer the first network 140. In an embodiment, the notification may be cancel location notification (e.g., a MAP: cancel location message). It is noted that other signaling techniques may be used notify the MMCS 150 that the current location of the mobile device 110 has been changed at the registration server 160, and that the examples provided above are provided for purposes of illustration, rather than by way of limitation.

In response to receiving the notification, the MMCS 150 may transmit a notification to the mobile device 110, where the notification indicates to the mobile device 110 that, at the registration server 160, the first connection 124 between the mobile device 110 and the first network 140 is no longer designated as the current location of the mobile device 110, and that the first connection is not designated as the primary connection for providing the at least one service to the mobile device 110. Stated another way, the notification may indicate to the mobile device 110 that MT communications are to be provided to the mobile device 110 via the second connection 134 to the second network, rather than via the first connection 124 to the first network 140. In an embodiment, the notification may be a SIP: notify message.

During operation according to embodiments, the notification transmitted from the MMCS 150 to the mobile device 110 may include a field that may be used to initiate pullback techniques. For example, a first value of the field may cause the mobile device 110 to initiate a pullback technique and a second value of the field may not cause the mobile device 110 to initiate a pullback technique. Setting the field of the notification to the first value or the second value may allow the MMCS 150 to control, at least in part, whether the mobile device 110 performs processing associated with the pullback technique. For example, if the MMCS 150 has received a notification from the first network entity 120 that the mobile device 110 is no longer registered with the first network 140 and the first network 120 (i.e., that the mobile device 110 is detached from the first network 140), the MMCS 150 may set the field of the notification to the second value prior to providing the notification to the mobile device 110. As another example, the MMCS 150 may set the field of the notification to the first value prior to sending the notification to the mobile device 110 if the MMCS 150 determines that the mobile device 110 is still attached to the first network 140 via the first network entity 120 (or another network entity of the first network 140). In an embodiment, the field may be an event field of the SIP: NOTIFY message and the first value may be set to shortened. The mobile device 110 may receive the notification from the MMCS 150, and, in response to receiving notification, the mobile device 110 may determine whether to initiate a pullback technique, where initiating the pullback technique includes refreshing the registration of the first connection 124 at the registration server 160.

In an embodiment, the mobile device 110 may determine whether to initiate the pullback technique based on whether the field of the notification has the first value or the second value. For example, when the field of the notification has the first value, the mobile device 110 may initiate operations to determine whether to pull back to the first network 140. That is to say, the mobile device 110 may initiate operations to determine whether to refresh the registration at the registration server 160 to indicate that the current location of the mobile device is the first network 140 (i.e., pullback the registration of the mobile device 110 to the first network 140), rather than the second network. As another example, when the field of the notification has the second value (e.g., when the mobile device 110 is detached from the first network 140), the mobile device 110 may not initiate operations to determine whether to pull back to the registration at the registration server 160 to the first network 140. In an additional or alternative embodiment, the mobile device 110 may determine whether to initiate the pullback operations independent of the value of the field of the notification. For example, the mobile device 110 may initiate the pullback operations to determine whether to pullback to a particular network in response to being notified that a network previously designated as a primary connection for providing at least one communication service to the mobile device 110 has been changed.

When the mobile device 110 determines that a pullback technique is to be initiated, the mobile device 110 may determine whether to pullback the current location of the mobile device 110 at the registration server 160 to the first network 140 based on one or more characteristics or attributes of the first connection 124 to the first network 140. For example, in an embodiment, the mobile device may determine whether the mobile device 110 is still connected to first network 140. If the mobile device 110 determines that the mobile device 110 is still connected to the first network 140, the mobile device 110 may transmit a pullback message to the MMCS 150. The pullback message may indicate to the MMCS 150 that the mobile device 110 is still accessible to and attached to the first network 140, and that MT communications may be routed to the mobile device 110 via the first network 140. In an embodiment, the pullback message may be a registration request message requesting that the MMCS 150 register the first connection 124 between the mobile device 110 and the first network entity 120 at the registration server 160. For example, the registration request message may be a SIP: REGISTER message.

When the MMCS 150 receives the pullback message from the mobile device 110, the MMCS 150 may update the current location of the mobile device 110 in the database accessible to the MMCS 150. Additionally, in response to receiving the pullback message from the mobile device, the MMCS may send a location update message to the registration server 160 to notify the registration server 160 that the mobile device 110 is currently located at the first network 140. In an embodiment, the location update message may be (e.g., a MAP: update location request). In an embodiment, refreshing the registration of the connection between the first network 140 and the mobile device 110 at the registration server 160 may include an exchange of one or more messages between the MMCS 150 and the registration server 160. For example, in an embodiment, the MMCS 150 may transmit the location update request to the registration server 160, and the registration server 160 may transmit an update location acknowledgement message (e.g., a MAP: insert subscriber data request message) to the MMCS 150 to indicate successful receipt of the location update request. In an embodiment, the update location acknowledgement message may include the subscription information associated with the mobile device 110. It is noted that other signaling techniques may be used to refresh the registration of the connection between the mobile device 110 and the first network 140 at the registration server 160, and that the examples provided above are provided for purposes of illustration, rather than by way of limitation.

Upon receiving the location update message, the registration server 160 may update its database to indicate the current location of the mobile device 110 is the first network 140, and that MT communications received via the second network may be routed to the mobile device 110 via the first network 140 (i.e., the connection to between the mobile device 110 and the first network 140 may be designated as a primary connection for providing at least one communication service to the mobile device 110 at the registration server 160). Thus, the pullback message transmitted to the MMCS 150 by the mobile device 110 may cause the MMCS 150 and the registration server 160 to pull the current location of the mobile device 110 from the second network back to the first network 140.

It is noted that, in some instances, the mobile device 110 may determine that the mobile device 110 is still connected to the first network 140 even when the connection between the mobile device 110 and the first network 140 is provided via a network entity of the first network 140 that is different from the first network entity 120. For example, the first network 140 may be provided via a plurality of network entities that includes the first network entity 120, and the mobile device 110 may roam from the first network entity 120 to another network entity of the plurality of network entities providing the first network 140. The mobile device 110 may determine that the mobile device 110 is still connected to the first network 140 even when the connection is provided by a network entity of the first network 140 other than the first network entity 120. In such instances, the pullback message may identify the network entity providing the current connection to the first network 140. Accordingly, when the current location of the mobile device 110 is pulled back to the first network 140 by the MMCS 150 and the registration server 160 (e.g., by updating the respective database entries), the current route through the first network 140 to the mobile device 110 may be determined to facilitate routing of communications from the second network to the mobile device 110 via the first network.

In an additional or alternative embodiment, the mobile device 110 may determine whether the mobile device 110 is within the coverage area 122 of the first network entity 120 or another coverage area of another network entity providing the first network 140. For example, the mobile device 140 may have moved out of the coverage area 122, but may have moved into another coverage area of another network entity providing the first network 140. In such instances, the mobile device 110 may register with the other network entity providing the first network 140, and may transmit a pullback message to the MMCS 150 indicating that the mobile device 110 is connected to the first network 140 via the other network entity. In response to receiving the pullback message, the MMCS 150 may update its database to indicate the current location of the mobile device 110 is the first network and that the mobile device 110 is accessible at the first network 140 via the other network entity. Additionally, the MMCS 150 may transmit a location update message to the registration server 160, thereby refreshing the registration of the connection between the mobile device 110 and the first network 140 at the registration server 160, as described above.

In an additional or alternative embodiment, the mobile device 110 may determine whether to pullback the registration of the mobile device 110 at the registration server 160 based on a quality of the connection between the mobile device 110 and the first network 140 and/or a quality of the connection between the mobile device 110 and the second network. For example, in an embodiment, the mobile device 110 may determine a signal to noise ratio (SNR) of the respective connections, a strength of signals received from the first network entity 120 and the second network entity 130, or other attributes and metrics of the first connection 124 and the second connection 134. If the signal to noise ratio (SNR) of the connection 122 to the first network 140 is high, the mobile device 110 may transmit the pullback message to the MMCS 150, thereby causing the MMCS 150 to update the registration of the mobile device 110 at the registration server 160 to pullback the current location of the mobile device 110 from the second network to the first network 140. If the signal to noise ratio (SNR) of the connection 122 to the first network 140 is low, the mobile device 110 may determine the SNR of the connection 132 to the second network. If the SNR of the connection 132 is higher than the SNR of the connection 122, the mobile device 110 may not transmit the pullback message to the MMCS 150. If the SNR of the connection 134 is lower than the SNR of the connection 124, the mobile device 110 may transmit the pullback message to the MMCS 150, thereby causing the MMCS 150 to update the registration of the mobile device 110 at the registration server 160 to pullback the current location of the mobile device 110 from the second network to the first network 140.

In an additional or alternative embodiment, the mobile device 110 may determine whether to transmit the pullback message to MMCS 150 to refresh the registration of the first connection 124 based on a data rate provided by the first connection 124 and/or the second connection 134. For example, if the quality determinations indicate that the first connection 124 is providing low data rates and the second connection 134 is providing a higher data rate, the mobile device 110 may not transmit the pullback message to the MMCS 150. However, if the quality determinations indicate that the first connection 124 is providing high data rates (e.g., a data rate satisfying a threshold data rate), the mobile device 110 may transmit the pullback message to the MMCS 150. In an embodiment, even when the first connection 124 provides the high data rate, the mobile device 110 may determine whether to transmit the pullback message to the MMCS 150 based on other factors, such as cost factors or factors associated with availability of services, or other factors, as described elsewhere herein. In an additional or alternative embodiment, the mobile device 110 may delay transmitting the pullback message until a subsequent time, such as if a subsequent determination of the quality of the connection between the mobile device 110 and the first network 140 indicates the connection has improved to a threshold level (e.g., a level that provides a threshold quality of service, a threshold SNR, a threshold data rate, etc.).

Refreshing the registration may cause the first connection 124 to be designated by the registration server 160 as the primary connection for providing the at least one service to the mobile device 110. Stated another way, after the registration of the first connection 124 between mobile device 110 and the first network 140 is refreshed, the registration server 160 may view the location of the mobile device 110 as the first network 140 and the first network entity 120, rather than the second network and the second network entity 130. Thus, in some embodiments, the pullback techniques ensure that, when the mobile device 110 is within the coverage area 122 of the first network entity 120 and the connection between the mobile device 110 and the first network 140 satisfies a quality threshold (e.g., a data rate threshold, a minimum quality of service, a threshold SNR, etc.), the registration server 160 views the current location of the mobile device 110 as the first network 140 and the AP 120. In additional or alternative embodiments, if the connection between the mobile device 110 and the second network is of a higher quality than the connection between the mobile device 110 and the first network 140, the mobile device 110 may not transmit the pullback message, thereby causing the registration server 160 to view the current location of the mobile device 110 to be the second network 140. Thus, in one or more disclosed embodiments, when MT communications to the mobile device 110 are received at the second network, the registration server 160 may provide information to other network entities to cause the MT communications to be provided to the mobile device 110 via a particular network (e.g., the first network 140 or the second network) that provides a better quality connection to the mobile device 110.

Thus, upon pulling back the registration of the current location of the mobile device 110 from the second network back to the first network 140, MT communications received by network entities of the second network may be routed to the mobile device 110 using the first network 140, which may not consume minutes of a user of the mobile device 110's subscription with a service provider. Additionally, as explained below, enabling MT communications to be routed to the mobile device 110 via the first network 140 may provide the mobile device 110 with access to enhanced services, such as video calls and the like. Additionally, in some embodiments, communication services may be provided to the mobile device 110 with more reliability and/or higher quality via the first network 140 than the second network. Utilizing the first network 140 to provide the communication services to the mobile device 110 may also be advantageous to the service provider operating the second network. For example, providing the communication services to the mobile device 110 via the first network 140 may reduce traffic demand and interference on the second network, which may increase the quality of service provided to mobile devices that are connected to the second network and that are not connected to another network. Additionally, the communication services may be provided to the mobile device 110 at a lower cost via the first network 140.

As another example, in an embodiment, the cost may be associated with the subscription that a user of the mobile device 110 has with a service provider. For example, some wireless communication service providers provide free hotspot access to wireless subscribers. Thus, the mobile device 110 may determine whether to pullback the registration to the first network 140 based on whether access to the first network 140 is provided as part of the subscription associated with the mobile device 110. For example, if access to the first network 140 is provided as part of the subscription associated with the mobile device 110, the mobile device 110 may determine to pullback the registration to the first network 140. If access to the first network 140 is not provided as part of the subscription associated with the mobile device 110, the mobile device 110 may not pullback the registration to the first network 140. In an additional or alternative embodiment, if access to the first network 140 is not provided as part of the subscription associated with the mobile device 110, the mobile device 110 may prompt a user as to whether the user would like to remain connected to the first network 140, and may or may not pullback the registration to the first network 140 depending on whether input received from the user indicates that the user would like to remain connected to the first network 140. In an embodiment, the mobile device 110 may determine to pullback the registration to the first network 140 even when the first network 140 is not associated with the subscription of the mobile device. Furthermore, it is noted that the mobile device 110 may utilize other cost information, such as whether more battery power is consumed receiving MT communications via the first network 140 or the second network, or combinations of different costs to determine whether to pull back the registration to the first network 140, and that the examples above are provided by way of illustration, rather than by way of limitation.

In yet another additional or alternative embodiment, the mobile device 110 may determine whether to transmit the pullback message based on services accessible to the mobile device 110 via the first network 140 and the second network. For example, in an embodiment, the first network 140 may be a Wi-Fi network and may provide enhanced services (e.g., voice over Wi-Fi (VoWiFi) calls, video calls, voice over internet protocol (VoIP) calls, etc.) to the mobile device 110 that are not available to the mobile device via the second network. For example, some service providers do not allow subscribers to make video calls unless the mobile device is connected to a Wi-Fi connection or other non-cellular connection. In such instances, when the current location of the mobile device 110 is designated at the registration server 160 as the second network, the mobile device 110 may not be able to receive MT communications that utilize the enhanced services. The mobile device 110 may determine whether the first network 140 provides the mobile device 110 with access to the enhanced services, and, when the first network 140 provides the mobile device 110 with access to the enhanced services, the mobile device 110 may transmit the pullback message to the MMCS 150.

In an additional or alternative embodiment, the mobile device 110 may determine whether to send the pullback message based on whether the second network is providing at least one service to the mobile device 110 when the notification indicating that the first network 140 is no longer designated as the primary connection for providing the at least one service to the mobile device 110 is received from the MMCS 150. To illustrate, upon registering the second connection 134 at the registration server 160, an MT communication may be received by the mobile device 110 via the second network prior to receiving the notification from the MMCS 150. Upon receiving the notification from the MMCS 150, the mobile device 110 may delay transmission of the pullback message until the MT communication received via the second network is complete (e.g., until the MT communication ends). Upon completing the MT communication, the mobile device 110 may transmit the pullback message to the MMCS 150 to refresh the registration of the first connection 124 at the registration server 160.

If, upon receiving the notification from the MMCS 150, the mobile device 110 determines that the second network is not providing at least one service to the mobile device 110, the mobile device 110 may not delay transmission of the pullback message to the MMCS 150. By selectively delaying transmission of the pullback message based on whether the second network is providing at least one service to the mobile device 110 when the notification is received, the pullback techniques provided by the mobile device 110 may be transparent to the user of the mobile device 110, and the at least one service may be provided to the mobile device 110 without interruption or loss of quality of service. It is noted that, in an aspect, if the first network 140 is providing at least one service (e.g., a VoWiFi call) to the mobile device 110 at the time the notification is received, the mobile device 110 may initiate the pullback operations without delay, since pulling back the registration of the mobile device 110 at the registration server 160 to be the first network 140 may not interrupt the providing of the at least one service to the mobile device 110. This may reduce the likelihood that a subsequent MT communication will be received at the mobile device 110 via the second network prior to refreshing the current location of the mobile device 110 at the registration server 160 to be the first network 140 (e.g., prior to pulling back the registration at the registration server 160 to the first network 140).

Thus, various embodiments of the system 100 provide pullback techniques that enable a mobile device to determine whether to pullback to a particular network of a plurality of networks to which the mobile device is operable to connect to. It is to be appreciated that one or more of the embodiments described above provide advantages over presently available communication networks and systems. For example, in embodiments of the pullback techniques described above, the mobile device 110 leverages information that may be known only to the mobile device 110, such as network availability/connectivity, quality of connection, cost information, battery consumption, access to enhanced services, etc., to determine whether to pullback the mobile device 110's registration at the registration server 160 from the second network to the first network 140. Additionally, the mobile device 110 is configured to delay pulling back the registration at the registration server 160 when the pulling back of the registration would interrupt services being provided to the mobile device 110. Thus, the system 100 provides a transparent process that enables a mobile device to control the designation of its current location at the registration server 160 based on a determination that a particular current location (e.g., a particular network of a plurality of networks the mobile device 110 is operable to connect to or is connected to) provides some advantage (e.g., better quality of service, lower cost, faster data rate, higher level of security, lower battery consumption, availability of enhanced services, etc.) to the mobile device 110. Furthermore, implementation of the pullback techniques disclosed herein may not require additional infrastructure to be added to the respective networks, which may reduce a cost to deploy the system 100.

In further embodiments of the system 100, network entities other than the mobile device 110 may initiate pullback techniques. For example, assume that a current registration of the mobile device 110 at the registration server 160 indicates that the mobile device 110's current location is the first network 140, but that the mobile device 110 has just moved out of range of the first network 140 (e.g., the first network 140 is unavailable). If a network entity operating in the second network attempts to initiate an MT communication to the mobile device 110 via the first network 140 at such time, the MT communication may fail because the mobile device 110 is no longer connected to the first network 140. This may cause the network entity to query the registration server 160 to obtain alternative information for routing the MT communication to the mobile device 110. In an aspect, the registration server 160 may, in response to receiving the request for alternative information for routing the MT communication to the mobile device 110, pullback the location of the mobile device 110 to a previously known location, such as the second network, and may provide the network entity with information for routing the MT communication to the mobile device 110 via the second network. Pulling back the location of the mobile device 110 by the registration server 160 may cause the current location of the mobile device 110 to be updated to the second network, and subsequently received MT communications may be routed to the mobile device 110 via the second network. In an embodiment, the registration server 160 may query a location management server (e.g., a VLR or mobile switching center (MSC)) serving the previously known location of the mobile device 110 to determine whether the previously known location is valid, and may initiate pullback of the registration to the previously known location only when the previously known location is determined to be a valid location (e.g., when the mobile device 110 is still served by the previously known location). Thus, in an embodiment, the registration server 160 may initiate one or more pullback techniques to designate a current location of the mobile device 110.

In an additional or alternative embodiment of the system 100, when the mobile device 110 leaves the coverage area 122, the first network entity 120 may start a subscriber purge timer. If the mobile device 110 does not re-register with the first network entity 120 before the subscriber purge timer expires, the first network entity 120 may de-register the mobile device 110, which may include transmitting an update location message to the registration server 160 indicating that the mobile device 110 is no longer accessible via the first network 140. For example, the mobile device 110 may leave the first coverage area 122, as indicated at 112, and the first network entity 120 may start the purge timer. If the mobile device 110 moves back into the first coverage area 122 and re-registers with the first network entity 120, as indicated at 114, the first network entity 120 may renew the registration of the connection between mobile device 110 and the first network 140. If, however, the mobile device 110 does not move back within the coverage area 122 before the subscriber purge timer expires, the first network entity 120 may de-register the mobile device 110 and transmit the notification message to the registration server 160 to indicate to the registration server 160 that the mobile device 110 is no longer located on the first network 140. This may cause the registration server 160 to roll back the location of the mobile device 110, as described above. Thus, in some embodiments, the network entities (e.g., the first network entity 120 and the second network entity 130) providing various networks may coordinate with the registration server 160 to provide pullback techniques to designate a current location of the mobile device 110.

It is noted that, although FIG. 1 has been described as initiating the pullback techniques with respect to a mobile device that is connected to a first network and a second network, the pullback techniques of embodiments may be used for connections to any number of networks. In an embodiment, the mobile device 110 may be connected to more than two networks and may initiate a pullback technique with respect to one or more of the more than two networks.

For example, the mobile device 110 may be operable to connect to a Wi-Fi network, an IMS network, and a cellular network. At a particular point in time, the mobile device 110 may simultaneously be within communication range of the Wi-Fi network, the IMS network, and the cellular network, and may establish a connection to each of the respective networks. During a subsequent update to the location of the mobile device at a particular one of the networks, such as through a periodic update procedure, one or more notifications may be transmitted to the mobile device 110 to indicate that the current location of the mobile device 110 at one or more of the networks has changed. To illustrate, the mobile device 110 may perform a periodic update of the connection to the IMS network, and an entity of the IMS network may transmit a location update message to a registration server of the Wi-Fi network (e.g., the MMCS 150) and a registration server of the cellular network (e.g., the registration server 160). The registration servers of the respective networks receiving the location update message may cause notifications to be sent to the mobile device 110 to indicate a change in the current location of the mobile device 110 at the respective registration servers. The mobile device 110 may then determine whether to pullback the registrations at each of the respective networks using one or more of the pullback techniques described above. In an embodiment, the mobile device 110 may transmit a pullback message to one of the respective registration servers without transmitting a pullback message to the other one of the respective registration servers. For example, the mobile device 110 may determine that it would be advantageous to pullback the registration at the Wi-Fi network to indicate the Wi-Fi network, but may not pullback the registration at the cellular network, thereby allowing the registration at the cellular network to point to the IMS network as a primary connection for providing at least one service to the mobile device 110. Thus, the pullback techniques of embodiments may be used with any number of networks that the mobile device 110 is operable to connect to.

As another example, in an embodiment, the mobile device 110 may establish connections with a 2G or 3G cellular network and a 4G/LTE cellular network. In such a scenario, the pullback techniques may be used by the mobile device 110 to determine whether to designate a current location of the mobile device 110 at a registration server of the 2G or 3G cellular network as the 4G/LTE and to designate the mobile device 110's connection to the 4G/LTE cellular network as the primary connection for providing at least one service (e.g., voice over LTE (VoLTE) calls) from the 2G or 3G cellular network to the mobile device 110. For example, when the current location of the mobile device 110 at a registration server (e.g., an HLR) of the 2G or 3G cellular network is changed from the 4G/LTE cellular network to the 2G or 3G cellular network, a notification message may be transmitted to the mobile device 110 indicating that, at the 2G or 3G cellular network, the 4G/LTE cellular network is not designated as a current location of the mobile device 110. In response to the notification, the mobile device 110 may use one or more of the pullback techniques described above to determine whether to pullback the registration at the registration server of the 2G or 3G cellular network to indicate that the current location of the mobile device 110 is the 4G/LTE cellular network. Thus, the pullback techniques of embodiments are not limited to initiating pullback with respect to any other particular type of network. Furthermore, in some embodiments, the mobile device 110 may be operable to implement pullback techniques of embodiments with respect to two or more networks of the same type (e.g., 2 or more Wi-Fi networks, 2 or more cellular networks, etc.).

It is noted that the mobile device 110 may perform periodic updates that may cause the registration server 160 to designate one of the connections to the first network or the second network as the primary connection/location for providing at least one service to the mobile device 110. For example, the periodic updates may occur without interaction of the user of the mobile device 110 and may cause the registration server 160 to update the location of the mobile device 110. In such instances, the MMCS 150 may be notified when the current location of the mobile device 110 is updated at the registration server 160, and, if the updated location indicates that the mobile device 110 is no longer located on the first network, the MMCS 150 may notify the mobile device 110, thereby causing the mobile device 110 to initiate one or more pullback techniques of embodiments to determine whether to pullback the registration of the current location of the mobile device 110 to a particular network.

The system 100 provides pullback techniques for designating a location of a mobile device at a registration server based on one or more factors (e.g., accessibility of each of the two or more networks), signal characteristics, costs, accessible services, etc. associated with two or more networks that the mobile device is connected to. Additionally, the mobile device is configured to use one or more pullback techniques of embodiments to determine whether to pullback a particular registration at a particular one or more of the two or more networks based on circumstances may only be within the knowledge of the mobile device, such as by determining the one or more factors (e.g., accessibility of each of the two or more networks), signal characteristics, costs, accessible services, etc. associated with two or more networks to which the mobile device is connected. Additionally, according to some embodiments, the mobile device is configured to postpone pulling back the registration at the two or more networks if the refreshing of the registration would interrupt services being provided to the mobile device. Thus, the system 100 facilitates pullback techniques of embodiments that provide a transparent process for pulling back the registration of the current location of the mobile device to particular networks, thereby ensuring that the user of the mobile device receives all of the benefits of the enhanced services and quality of service benefits that may be provided by the networks to which the mobile device is connected. Additionally, the pullback techniques of embodiments provided by the system 100 may be integrated with and implements at the two or more networks at a reduced cost, and, once implemented, may further reduce the cost to operate both the mobile device and the two or more networks.

Figure 2:
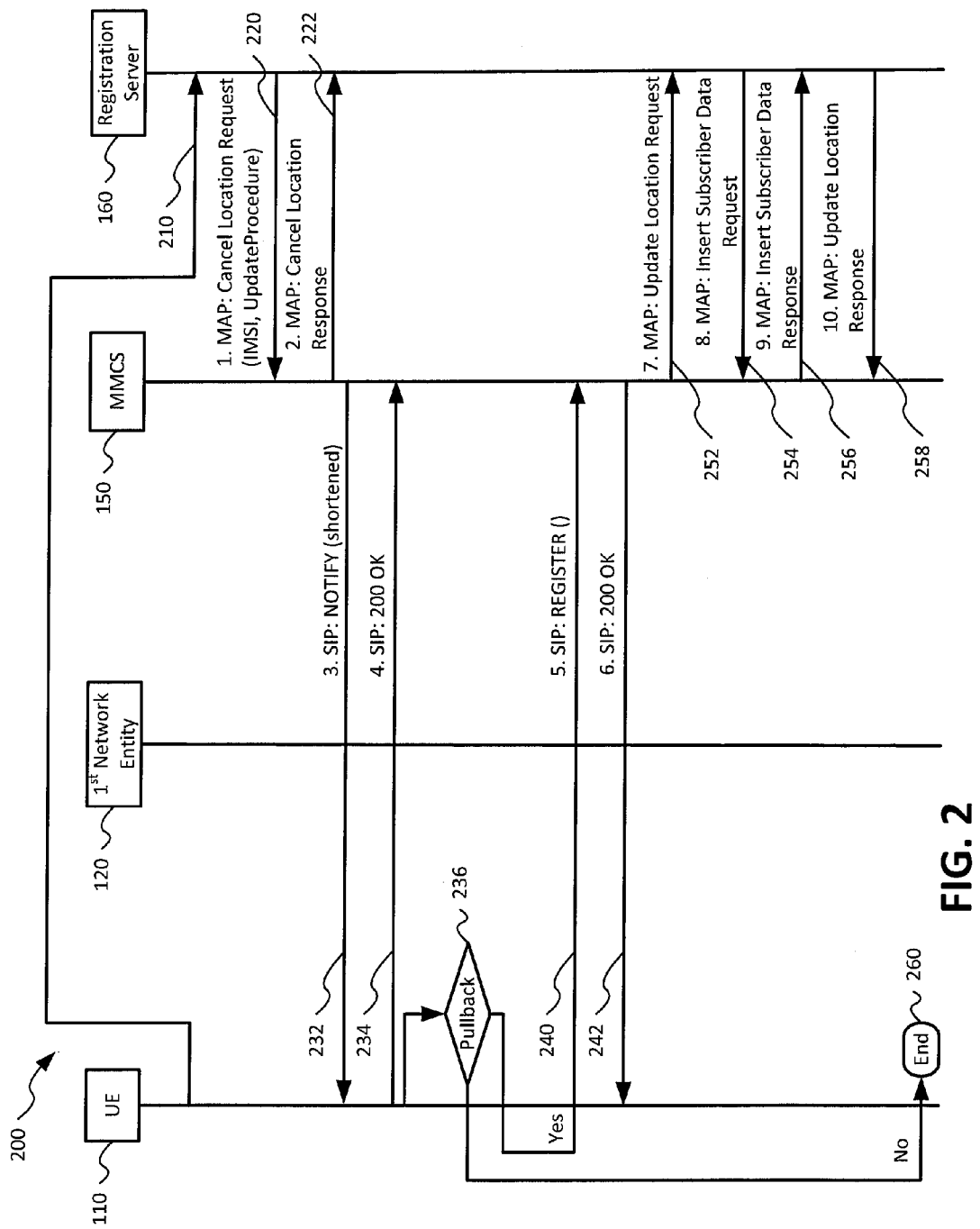
FIG. 2 is a ladder diagram illustrating an exemplary message flow for initiating a pullback technique to designate a network of a plurality of networks to which a mobile device is connected as a primary network for providing at least one service to the mobile device according to embodiments of the invention.

Referring to FIG. 2, a ladder diagram illustrating an exemplary message flow for initiating a pullback technique to designate a network of a plurality of networks to which a mobile device is connected as a primary network for providing at least one service to the mobile device is shown as a message flow 200. In FIG. 2, the mobile device 110, the first network entity 120, the MMCS 150, and the registration server 160 of FIG. 1 are shown. In FIG. 2, it is assumed that, prior to beginning the message flow 200, the mobile device 110 has registered a connection to the first network 140 of FIG. 1 at the registration server 160.

At 210, the mobile device 110 may register a connection (e.g., the connection 134) to the second network (e.g., a connection to 2G network or a 3G network) with the registration server 160. The registration server 160, upon registering the connection between the mobile device 110 and the second network, may determine that the prior registration of the connection between mobile device 110 and the first network 140 is no longer a valid connection or a primary connection for providing at least one service to the mobile device 110 (e.g., because the registration of the connection between the mobile device 110 and the second network was the last connection registered at the registration server 160). Stated another way, upon registering the connection between the mobile device 110 and the second network, the registration server 160 views the mobile device 110's location as being the second network, rather than the first network 140.

At 220, in response to registering the connection between the mobile device 110 and the second network, the registration server 160 may transmit a notification to the MMCS 150. In an embodiment, the notification may indicate to the MMCS 150 that the registration server 160 has designated the location of the mobile device 110 to be the second network (i.e., the connection between the mobile device 110 and the second network may be a primary connection for providing at least one service to the mobile device 110). Thus, MT communications received at the second network may be provided via the second network, even though the mobile device 110 is still connected to the first network 140. In an embodiment, the notification may be a MAP: Cancel Location Request.

At 222, the MMCS 150 may respond to the notification by transmitting an acknowledgement message to the registration server 160. The acknowledgement message may inform the registration server 160 that the MMCS 150 successfully received the notification. In an embodiment, the acknowledgement message may be a MAP: Cancel Location Response. Additionally, in response to receiving the notification, the MMCS 150 may transmit, at 232, notification to the mobile device 110. The notification transmitted at 232 may indicate to the mobile device 110 that the current location of the mobile device 110 is the second network (e.g., that the registration server 160 has registered the mobile device 110's current location as the second network). In an embodiment, the notification transmitted at 232 may be a SIP: NOTIFY message that has the event field set to shortened. At 234, the mobile device 110 transmits an acknowledgement message to the MMCS 150 to acknowledge successful receipt of the notification transmitted at 232. In an aspect, the acknowledgement transmitted at 234 may be a SIP 200 OK message.

At 236, the mobile device 110 may determine whether to use one or more pullback techniques (e.g., one or more of the pullback techniques described with reference to FIG. 1) to pullback the mobile device 110's registration of the mobile device 110's connection with the first network 140 at the registration server 160. If the mobile device 110 determines that the registration at the registration server 160 is not to be pulled back (e.g., because the mobile device 110 is no longer connected to the first network 140), the mobile device 110 may not initiate the pullback to the first network 140, and the message flow 200 may end, as shown at 260. However, if the mobile device 110 determines that the registration at the registration server 160 is to be pulled back the mobile device 110 may, at 240, transmit a pullback message to the MMCS 150. The pullback message may correspond to a request to refresh the registration of the connection between the mobile device 110 and the first network 140 at the registration server 160, thereby updating the current location of the mobile device 110 at the registration server 160 to be the first network 140. In an embodiment, the pullback message may be a SIP: REGISTER message. At 242, the MMCS 150 may acknowledge receipt of the pullback message by transmitting an acknowledgement message to the mobile device 110. In an aspect, the acknowledgement message transmitted at 242 may be a SIP: 200 OK message.

Additionally, in response to receiving the pullback message, the MMCS 150 may transmit a location update message, at 252, to the registration server 160. The location update message may refresh the registration of the connection between the mobile device 110 and the first network 140 at the registration server 160. In an embodiment, the location update message transmitted at 252 may be a MAP: Update Location Request. The registration server 160 may respond to the location update message by transmitting, at 254, an update location acknowledgement message to the MMCS 150. In an embodiment, the update location acknowledgement message may include information associated with the mobile device 110, such as subscription information associated with a cellular subscription of the mobile device 110 and other information associated with the mobile device 110. The MMCS 150 may update an entry in its database using the information included in the update location acknowledgement message. In an embodiment, the update location acknowledgement message may be a MAP: insert subscriber data response.

The MMCS 150 may, at 256, transmit an acknowledgment message to the registration server 160, where the acknowledgment message indicates that the update location acknowledgement message was successfully received at the MMCS 150 and the entry at the database of the MMCS 150 that is associated with the mobile device 110 has been updated using the information included in the update location acknowledgement message. In an aspect, the acknowledgement message transmitted at 256 may be a MAP: Insert Subscriber Data Response. In response to receiving acknowledgement message, the registration server 160 may update an entry in its database to indicate that the current location of the mobile device 110 is the first network 140, and may, at 258, transmit a response message to the MMCS 150. The response message may indicate that the current location of the mobile device 110 has been successfully updated at the registration server 160 to be first network 140, and that the registration server 160 may provide at least one service to the mobile device 110 via the first network 140 instead of the second network. This may reduce a load on the second network, and may increase the quality of the at least one service provided to the mobile device 110.

Thus, for a mobile device connected to a plurality of networks, the message flow 200 provides signaling for designating a particular network of the plurality of networks as a primary network for providing at least one service to the mobile device. This may reduce a cost to operate the mobile device and/or at least one of the plurality of networks (e.g., because it may be cheaper to provide the at least one service to the mobile device via the particular network), and may increase the quality of the at least one service provided to the mobile device (e.g., because the particular network may provide higher data rates, enhanced services, better quality of service, etc.). Additionally, the message flow 200 provides for maintaining the connection between the mobile device and the particular network as a primary connection for providing the at least one service to the mobile device without interruption or loss of services to the mobile device (e.g., provides a seamless experience for a user of the mobile device).

Figure 3:
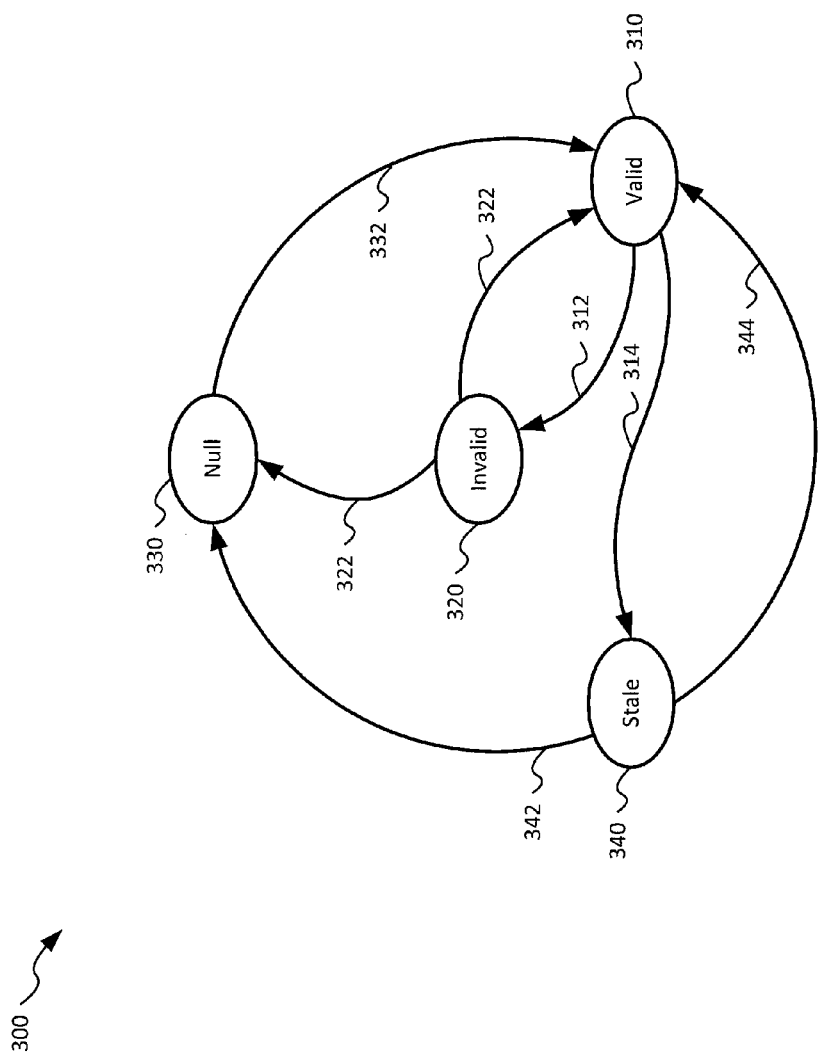
FIG. 3 is a state diagram illustrating mobile device registration state transitions as perceived by a Multimedia Communication Server (MMCS) in operation according to embodiments of the invention.

Referring to FIG. 3, a state diagram illustrating mobile device registration state transitions as perceived by a Multimedia Communication Server (MMCS) in operation according to embodiments is shown as a state diagram 300. In an aspect, the MMCS may be the MMCS 150 of FIG. 1.

As shown in FIG. 3, a mobile device that is registered with the MMCS may be associated with a valid state 310, an invalid state 320, a null state 330, and a stale state 340. The valid state 310 may indicate that the mobile device has been successfully connected to a particular network and that the current location of the mobile device at a registration server of another particular network has been updated to indicate the current location of mobile device is the particular network. Additionally, the valid state 310 may indicate that the subscriber profile is valid to use, such as to initiate a refresh of the registration at the other particular network if the MMCS receives a pullback message from the mobile device. The invalid state 320 may indicate that mobile device is not registered with the particular network served by the MMCS. The null state 330 may indicate that the subscriber profile does not exist at the MMCS 150 (or at the database of the MMCS 150). The stale state 340 may indicate that a notification indicating that the location of the mobile device, as viewed by a registration server, has been changed to a network other than the network served by the MMCS.

The mobile device has the valid state 310 when the mobile device is registered with or connected to a network served by the MMCS and a registration server (e.g., the registration server 160 of FIG. 1) has set the mobile device's location as on the network served by the MMCS. Stated another way, when location of the mobile device is designated as the network served by the MMCS at the registration server, the state of the mobile device at the MMCS may be the valid state 310.

The state of the mobile device may transition from the valid state 310 to the invalid state 320, as indicated at 312, when the mobile device de-registers with the MMCS. The mobile device may de-register with the MMCS when the mobile device leaves a coverage area of the network served by the MMCS or is unable to connect to the network served by the MMCS despite being within the coverage area of the network. For example, a user of the mobile device may be at home and connected to a home Wi-Fi network, and as the user leaves his home, the mobile device may leave the coverage area of the home Wi-Fi network. Thus, the mobile device may de-register the connection to the Wi-Fi network with the MMCS, and the state for the mobile device may transition from the valid state 310 to the invalid state 320. In an embodiment, the operations to pullback the registration of the mobile device to a particular network may not be performed when the mobile device enters the invalid state 320 because the mobile device only enters the invalid state 320 when the mobile device de-registers or leaves the coverage area of the particular network, and the de-registering of the mobile device's connection to the particular network may be known to the MMCS.

The state of the mobile device may transition from the invalid state 320 to the valid state 310, as indicated at 322, when the client registers with the MMCS (e.g., registers a connection to the Wi-Fi network). For example, when the mobile device connects to the network served by the MMCS, the mobile device may register the connection with the MMCS, and the MMCS may update the location of the mobile device at the HLR to be the network served by the MMCS, thereby transitioning the state of the mobile device from the invalid state 320 to the valid state 310.

The state of the mobile device may transition from the invalid state 320 to the null state 330, as indicated at 322, in response to an expiration of a subscriber purge timer (e.g., the MMCS has not received a registration message from the mobile device for a period of time) or in response to a cancel location request is received from the registration server. The state of the mobile device may transition from the null state 330 to the valid state 310, as indicated at 332, when the mobile device location is updated to the be the network served by the MMCS. For example, the mobile device may be in the Null state 330 and then enter a coverage area of the network served by the MMCS. If the mobile device connects to the network, the MMCS may update the location of the mobile device at the registration server to point to the network served by the MMCS. Upon successful completion of the update location at the registration server, the mobile device may be in the valid state 310.

The state of the mobile device may transition from the valid state 310 to the stale state 340, as indicated at 314, when the MMCS receives a cancel location request while the mobile device is on an active call. This may occur when the mobile device registers a connection to a network other than the network served by the MMCS and receives a MT communication via the other network prior to the MMCS notifying the mobile device of the change in the registration at the registration server, as described with reference to FIG. 1. From the stale state 340, the mobile device's state may transition to the null state 330 or the valid state 310. The state of the mobile device transitions from the stale state 340 to the valid state 310, as indicated at 344, when the mobile device's current location is updated at the registration server to point to the network served by the MMCS. This may occur, for example, if the mobile device refreshes the registration of the connection to the network served by the MMCS upon completing the MT communication. The state of the mobile device may transition from the stale state 340 to the null state 330, as indicated at 342, when the mobile device does not refresh the registration of the connection to the network served by the MMCS prior to the expiration of a subscriber pullback timer (e.g., the MMCS has not received a request to refresh the registration of the connection between the mobile device and the Wi-Fi network within a pre-determined period of time). For example, the MT communication received as the mobile device transitioned from the valid state 310 to the stale state 340 may last a first amount of time, and the mobile device will not attempt to refresh the registration of the connection to the network served by the MMCS until after the MT communication is completed. If the duration of the MT communication exceeds a duration of the subscriber pullback timer, the MMCS may assume that the mobile device has left the coverage of the network served by the MMCS and may transition the state of the mobile device to the null state 330.

Figure 4:
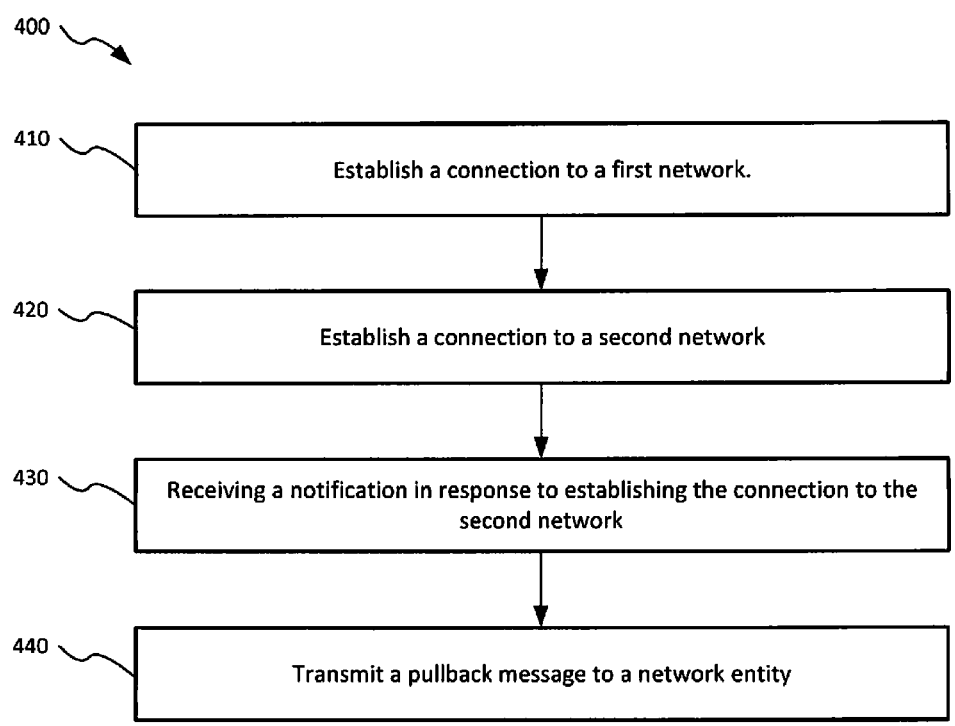
FIG. 4 is a flowchart of a method for initiating a pullback technique by a mobile device to designate a network of a plurality of networks to which the mobile device is connected as a primary network for providing at least one service to the mobile device according to embodiments of the invention.

Referring to FIG. 4, a method for initiating a pullback mechanism by a mobile device to designate a network of a plurality of networks to which the mobile device is connected as a primary network for providing at least one service to the mobile device is shown as a method 400. In an aspect, the method 400 may be performed by a mobile device (e.g., the mobile device 110) operating in a wireless communication system (e.g., the system 100 of FIG. 1).

At 410, the method 400 includes establishing a connection to a first network, and, at 420, establishing a connection to a second network. In an aspect, the first network may be the first network 140 of FIG. 1, and the connection to the first network may be the first connection 124 of FIG. 1. Additionally, the connection to the first network may be established as described with reference to FIGS. 1 and/or 2, and may include exchanging messages with an MMCS (e.g., the MMCS 150 of FIG. 1), as described with reference to FIGS. 1 and/or 2. In an aspect, the second network may be the second network described with reference to FIG. 1, and the connection to the second network may be the second connection 134 of FIG. 1.

At 430, the method 400 includes receiving a notification in response to establishing the connection to the second network. The notification may indicate that the connection to the second network has been designated (e.g., by a registration server) as a connection for providing at least one service to the mobile device. In an embodiment, the notification may be received at the mobile device from the MMCS. At 440, the method 400 includes transmitting a pullback message to a network entity. The pullback message may include a request to designate the connection to the first network as the primary connection for providing the at least one service to the mobile device. In an embodiment, the network entity may be the MMCS. In an embodiment, the mobile device may determine an availability of the connection to the first network in response to receiving the notification, an may selectively transmit the pullback message to the network entity based on a determined availability of the connection to the first network, as described with reference to FIG. 1. In an additional or alternative embodiment, the mobile device may determine whether the second network is providing the at least one service to the mobile device in response to receiving the notification, and may selectively transmit the pullback message to the network entity based on a determination of whether the second network is providing the at least one service to the mobile device, as described with reference to FIG. 1. When the second network is providing the at least one service to the mobile device, the mobile device may delay transmission of the pullback message to the network entity. The mobile device may not delay transmission of the message to the network entity in response to a determination that the second network is not providing the at least one service to the mobile device. In an additional or alternative embodiment, the mobile device may determine one or more characteristics of the connection to the first network and the second network, and may selectively transmit the pullback message to the network entity based on the one or more characteristics. Other techniques of embodiments for determining whether to transmit the pullback message may be used by the mobile device, and the examples provided above are provided for purposes of illustration, rather than by way of limitation.

The method 400 may be used to provide a user of the mobile device with a seamless experience while ensuring that services are provided to the mobile device via the first network so long as the first network is accessible to the mobile device and providing a desired quality of connection, quality of service, data rate, cost, service, etc. For example, in operation according to an embodiment, because the mobile device is connected to both the first network and the second network, when the mobile device leaves a coverage area of the first network, the mobile device may still initiate and receive communications via the second network. Additionally, the pullback techniques of embodiments for pulling the primary connection for providing services to the mobile device back to the first network, as provided by the method 400, may reduce a cost to provide the services to the mobile device, and may reduce a cost to operate the mobile device. Additionally, the method 400 may enable enhanced services to be provided to the mobile device through the first network that may not be available when the services are provided to the mobile device via the second network, or that may be provided at a lower quality when provided via the second network.

Figure 5:
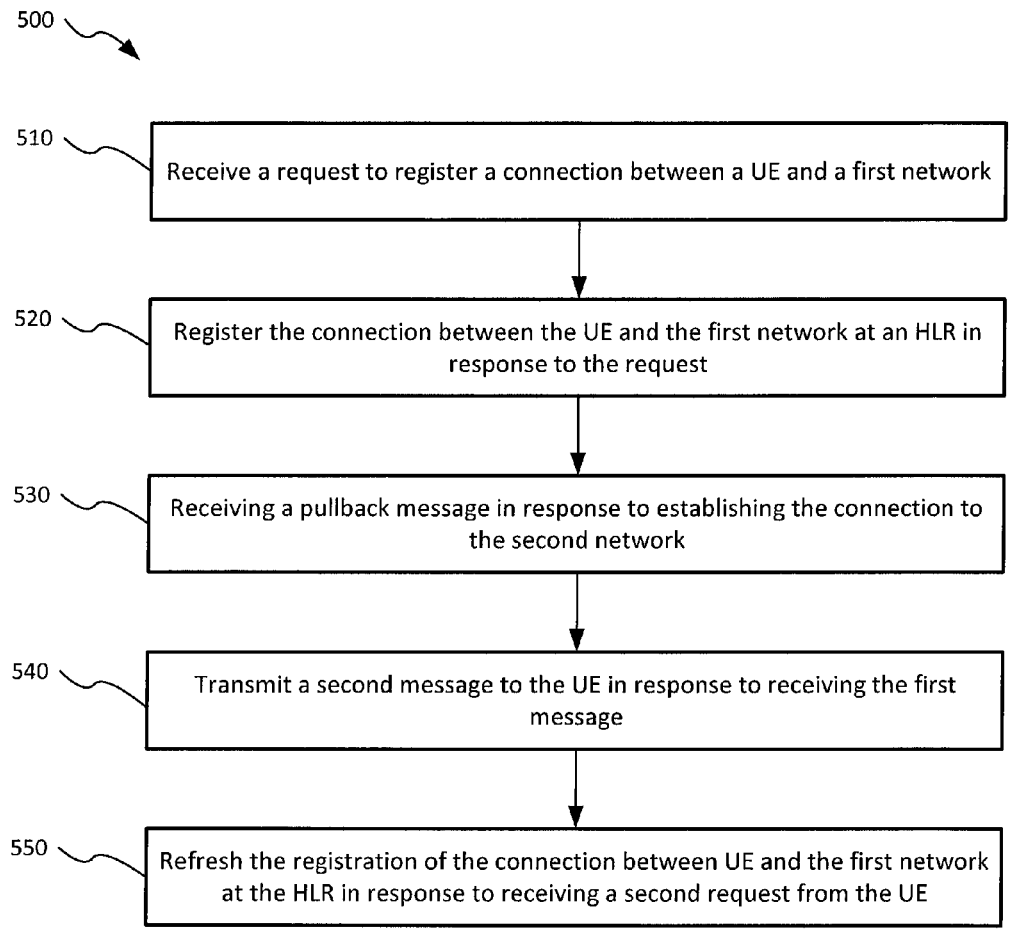
FIG. 5 is a flowchart of an embodiment of a method for initiating a pullback technique by a multimedia service center (MMCS) to determine whether to designate a network of a plurality of networks to which a mobile device is connected as a primary network for providing at least one service to the mobile device.

Referring to FIG. 5, a flowchart of an embodiment of a method for initiating a pullback technique by a multimedia service center (MMCS) to determine whether to designate a network of a plurality of networks to which a mobile device is connected as a primary network for providing at least one service to the mobile device is shown as a method 500. In an aspect, the method 500 may be performed by a MMCS (e.g., the MMCS 150) operating as part of or in communication with a wireless communication system (e.g., the system 100 of FIG. 1).

At 510, the method 500 includes receiving a request to register a connection between a mobile device and a first network. In an aspect, the mobile device may be the mobile device 110 of FIG. 1 and the first network may be the first network 140 of FIG. 1. In an aspect, the request may be received using signaling similar elements 240 and 242 of FIG. 2. At 520, the method includes, in response to the request, registering the connection between the mobile device and the first network at a registration server. In an aspect, the registration server may be the registration server 160 of FIG. 1. Registration of the connection between the mobile device and the first network at the registration server may cause the registration server to update the location of the mobile device to be the first network, as described with reference to FIG. 1. In an aspect, the MMCS may register the location of the mobile device with the registration server using signaling similar to the signaling described with reference to elements 252, 254, 256, and 258 of FIG. 2.

At 530, the method 500 includes receiving a notification indicating that the mobile device has been registered with a second network at the registration server. This may indicate that, at the registration server, a connection between the mobile device and the second network is designated as a primary connection for providing at least one service to the mobile device, as described with reference to FIG. 1. In an embodiment, the notification may correspond to the notification described with reference to element 220 of FIG. 2. At 540, the method 500 includes transmitting a notification to the mobile device in response to receiving the notification received at 530. The notification received at 540 may indicate that the connection between the mobile device and the second network is designated as the primary connection for providing the at least one service to the mobile device. In an embodiment, the notification received at 540 may be a SIP: notify message having an event field set to shortened, as described with reference to FIGS. 1 and 2. The mobile device may use one or more pullback techniques of embodiments to determine whether to pull back to the first network, as described with reference to FIGS. 1 and 2, in response to the notification received at 540. If the mobile device determines to remain located on the second network, the method 500 may end. If the mobile device determines to pull back to the first network, the method 500 may include, at 550, refreshing the registration of the connection between mobile device and the first network at the registration server in response to receiving a pullback message from the mobile device by the MMCS. The refreshing of the registration may cause the connection between the first network and the mobile device to be designated as the primary connection for providing the at least one service to the mobile device. That is, the refreshing may cause the current location of the mobile device, as viewed by the registration server, to be the first network, as described with reference to FIGS. 1 and 2. In an aspect, the pullback message may correspond to the pullback message described with reference to element 240 of FIG. 2, and the refreshing of the registration may be performed using the messages described with reference to elements 242, 252, 254, 256, and 258 of FIG. 2.

The method 500 may be used to provide a user of the mobile device with a seamless experience while ensuring that services are provided to the mobile device via the first network so long as the first network is accessible to the mobile device and providing a desired quality of connection, quality of service, data rate, cost, service, etc. For example, during operation according to an embodiment, because the mobile device is connected to both the first network and the second network, when the mobile device leaves a coverage area of the first network, the mobile device may still initiate and receive communications via the second network. Additionally, the pullback techniques of embodiments for pulling the primary connection for providing services to the mobile device back to the first network, as provided by the method 500, may reduce a cost to provide the services to the mobile device, and may reduce a cost to operate the mobile device. Additionally, the method 500 may enable enhanced services to be provided to the mobile device through the first network that may not be available when the services are provided to the mobile device via the second network, or that may be provided at a lower quality when provided via the second network.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   establishing, by a mobile device, a connection to a first network;
   establishing, by the mobile device, a connection to a second network;
   receiving, by the mobile device, a notification in response to establishing the connection to the second network, wherein the notification indicates that the connection to the second network has been designated as a primary connection for providing at least one service to the mobile device; and
   transmitting, by the mobile device, a pullback message to a network entity, wherein the pullback message includes a request to refresh a registration of the connection between the mobile device and the first network at a registration server, and wherein the refreshing of the registration causes the connection between the mobile device and the first network to be designated as the primary connection for providing the at least one service to the mobile device.

2. The method of claim 1, wherein the method includes:
   in response to receiving the notification, determining, by the mobile device, an availability of the connection to the first network; and
   selectively transmitting the pullback message to the network entity based on a determination of whether the connection to the first network is available.

3. The method of claim 1, wherein the method includes:
   in response to receiving the notification, determining, by the mobile device, whether the second network is providing the at least one service to the mobile device; and
   selectively transmitting the pullback message to the network entity based on a determination of whether the second network is providing the at least one service to the mobile device.

4. The method of claim 3, wherein selectively transmitting the pullback message to the network entity includes delaying transmission of the pullback message to the network entity in response to a determination that the second network is providing the at least one service to the mobile device, where transmission of the pullback message is delayed until the providing of the at least one service to the mobile device by the second network is complete.

5. The method of claim 3, wherein transmission of the pullback message to the network entity is not delayed in response to a determination that the second network is not providing the at least one service to the mobile device.

6. The method of claim 1, wherein the connection to the first network is established using a first radio access technology (RAT), and wherein the connection to the second network is established using a second RAT that is different from the first RAT.

7. The method of claim 1, wherein the connection to the first network is a connection to a wireless fidelity (Wi-Fi) network or Long Term Evolution (LTE) network, and wherein the connection to the second network is a wireless connection to a cellular network.

8. The method of claim 1, wherein:
establishing the connection to the first network includes registering the connection to the first network by the mobile device with a registration server of the second network; and
establishing the connection to the second network includes registering the connection to the second network by the mobile device with the registration server.

9. The method of claim 8, wherein the connection to the first network is designated as the primary connection for providing the at least one service to the mobile device until the registration of the connection to the second network with the registration server.

10. An apparatus comprising:
a memory; and
a processor coupled to the memory, the processor configured to perform operations comprising:
establishing a connection between a mobile device to a first network;
establishing a connection between the mobile device and a second network;
receiving a notification in response to establishing the connection to the second network, wherein the notification indicates that the connection to the second network has been designated as a primary connection for providing at least one service to the mobile device; and
transmitting a pullback message to a network entity, wherein the pullback message includes a request to designate the connection between the mobile device and the first network as the primary connection for providing the at least one service to the mobile device, wherein the designation is caused by refreshing, at a registration server, a registration of the connection between the mobile device and the first network.

11. The apparatus of claim 10, wherein the operations include:
in response to receiving the notification, determining, by the mobile device, an availability of the connection to the first network; and
selectively transmitting the pullback message to the network entity based on a determination of whether the connection to the first network is available.

12. The apparatus of claim 10, wherein the operations include:
in response to receiving the notification, determining, by the mobile device, whether the second network is providing the at least one service to the mobile device; and
selectively transmitting the pullback message to the network entity based on a determination of whether the second network is providing the at least one service to the mobile device.

13. The apparatus of claim 12, wherein selectively transmitting the pullback message to the network entity includes delaying transmission of the pullback message to the network entity in response to a determination that the second network is providing the at least one service to the mobile device, and wherein transmission of the pullback message is delayed until the providing of the at least one service to the mobile device by the second network is complete.

14. The apparatus of claim 12, wherein transmission of the pullback message to the network entity is not delayed in response to a determination that the second network is not providing the at least one service to the mobile device.

15. The apparatus of claim 10, wherein the connection to the first network is established using a first radio access technology (RAT), and wherein the connection to the second network is established using a second RAT that is different from the first RAT.

16. The apparatus of claim 10, wherein the connection to the first network is a connection to a wireless fidelity (Wi-Fi) network or Long Term Evolution (LTE) network, and wherein the connection to the second network is a wireless connection to a cellular network.

17. The apparatus of claim 10, wherein:
establishing the connection to the first network includes registering the connection to the first network by the mobile device with a registration server of the second network; and
establishing the connection to the second network includes registering the connection to the second network by the mobile device with the registration server.

18. The apparatus of claim 17, wherein the connection to the first network is designated as the primary connection for providing the at least one service to the mobile device until the registration of the connection to the second network with the registration server.

19. A non-transitory computer-readable storage medium storing instructions that, when executed by a processor, cause the processor to perform operations comprising:
establishing a connection between a mobile device to a first network;
establishing a connection between the mobile device and a second network;
receiving a pullback message in response to establishing the connection to the second network, wherein the pullback message indicates that the connection to the second network has been designated as a primary connection for providing at least one service to the mobile device; and
transmitting a pullback message to a network entity, wherein the pullback message includes a request to designate the connection to between the mobile device and the first network as the primary connection for providing the at least one service to the mobile device, wherein the designation is caused by refreshing, at a registration server, a registration of the connection between the mobile device and the first network.

20. The non-transitory computer-readable storage medium of claim 19, wherein the operations include:
in response to receiving the pullback message, determining, by the mobile device, an availability of the connection to the first network; and selectively transmitting the pullback message to the network entity based on a determination of whether the connection to the first network is available.

21. The non-transitory computer-readable storage medium of claim 19, wherein the operations include:
   in response to receiving the pullback message, determining, by the mobile device, whether the second network is providing the at least one service to the mobile device; and
   selectively transmitting the pullback message to the network entity based on a determination of whether the second network is providing the at least one service to the mobile device.

22. The non-transitory computer-readable storage medium of claim 21, wherein selectively transmitting the pullback message to the network entity includes delaying transmission of the pullback message to the network entity in response to a determination that the second network is providing the at least one service to the mobile device, and wherein transmission of the pullback message is delayed until the providing of the at least one service to the mobile device by the second network is complete.

23. The non-transitory computer-readable storage medium of claim 21, wherein transmission of the pullback message to the network entity is not delayed in response to a determination that the second network is not providing the at least one service to the mobile device.

24. The non-transitory computer-readable storage medium of claim 19, wherein the connection to the first network is established using a first radio access technology (RAT), and wherein the connection to the second network is established using a second RAT that is different from the first RAT.

25. The non-transitory computer-readable storage medium of claim 19, wherein the connection to the first network is a connection to a wireless fidelity (Wi-Fi) network or Long Term Evolution (LTE) network, and wherein the connection to the second network is a wireless connection to a cellular network.

26. The non-transitory computer-readable storage medium of claim 19, wherein:
   establishing the connection to the first network includes registering the connection to the first network by the mobile device with a registration server of the second network; and
   establishing the connection to the second network includes registering the connection to the second network by the mobile device with the registration server.

27. The non-transitory computer-readable storage medium of claim 26, wherein the connection to the first network is designated as the primary connection for providing the at least one service to the mobile device until the registration of the connection to the second network with the registration server.

28. A method comprising:
   receiving, by a multimedia communication server (MMCS), a request to register a connection between a mobile device and a first network;
   in response to receiving the request, registering, by the MMCS, the connection between the mobile device and the first network at a registration server of a second network;
   receiving, by the MMCS, a first notification indicating that the mobile device has been registered with the second network at the registration server, wherein, at the registration server, a connection between the mobile device and the second network is designated as a primary connection for providing at least one service to the mobile device;
   in response to receiving the first notification, transmitting a second notification to the mobile device, wherein the second notification indicates that the connection between the mobile device and the second network is designated as the primary connection for providing the at least one service to the mobile device; and
   in response to receiving a pullback message from the mobile device, refreshing, by the MMCS, the registration of the connection between the mobile device and the first network at the registration server, wherein refreshing the registration causes the connection between the first network and the mobile device to be designated as the primary connection for providing the at least one service to the mobile device.

29. The method of claim 28, wherein the connection between the mobile device and the first network is a connection to a wireless fidelity (Wi-Fi) network or Long Term Evolution (LTE) network, and wherein the connection between the mobile device and the second network is a wireless connection to a cellular network.

30. The method of claim 28, wherein the request is a session initiation protocol (SIP) REGISTER message, wherein the first notification is a MAP cancel location request, and wherein the second notification is a SIP NOTIFY message having an event field set to a value of "shortened".

31. An apparatus comprising:
   a memory; and
   a processor coupled to the memory, the processor configured to perform operations comprising:
      receiving a request to register a connection between a mobile device and a first network;
      in response to receiving the request, registering the connection between the mobile device and the first network at a registration server of a second network;
      receiving a first notification indicating that the mobile device has been registered with the second network at the registration server, wherein, at the registration server, a connection between the mobile device and the second network is designated as a primary connection for providing at least one service to the mobile device;
      in response to receiving the first notification, transmitting a second notification to the mobile device, wherein the second notification indicates that the connection between the mobile device and the second network is designated as the primary connection for providing the at least one service to the mobile device; and
      in response to receiving a pullback message from the mobile device, refreshing the registration of the connection between the mobile device and the first network at the registration server, wherein refreshing the registration causes the connection between the first network and the mobile device to be designated as the primary connection for providing the at least one service to the mobile device.

32. The apparatus of claim 31, wherein the connection between the mobile device and the first network is a connection to a wireless fidelity (Wi-Fi) network or Long Term Evolution (LTE) network, and wherein the connection between the mobile device and the second network is a wireless connection to a cellular network.

33. The apparatus of claim 31, wherein the request is a session initiation protocol (SIP) REGISTER message, wherein the first notification is a MAP cancel location request, and wherein the second notification is a SIP NOTIFY message having an event field set to a value of "shortened".

34. A non-transitory computer readable medium storing instructions that, when executed by a processor, cause the processor to perform operations comprising:
- receiving, by a multimedia communication server (MMCS), a request to register a connection between a mobile device and a first network;
- in response to receiving the request, registering, by the MMCS, the connection between the mobile device and the first network at a registration server of a second network;
- receiving, by the MMCS, a first notification indicating that the mobile device has been registered with the second network at the registration server, wherein, at the registration server, a connection between the mobile device and the second network is designated as a primary connection for providing at least one service to the mobile device;
- in response to receiving the first notification, transmitting a second notification to the mobile device, wherein the second notification indicates that the connection between the mobile device and the second network is designated as the primary connection for providing the at least one service to the mobile device; and
- in response to receiving a pullback message from the mobile device, refreshing, by the MMCS, the registration of the connection between the mobile device and the first network at the registration server, wherein refreshing the registration causes the connection between the first network and the mobile device to be designated as the primary connection for providing the at least one service to the mobile device.

35. The non-transitory computer readable medium of claim 34, wherein the connection between the mobile device and the first network is a connection to a wireless fidelity (Wi-Fi) network or Long Term Evolution (LTE) network, and wherein the connection between the mobile device and the second network is a wireless connection to a cellular network.

36. The non-transitory computer readable medium of claim 34, wherein the request is a session initiation protocol (SIP) REGISTER message, wherein the first notification is a MAP cancel location request, and wherein the second notification is a SIP NOTIFY message having an event field set to a value of "shortened".

* * * * *